US008783919B2

(12) United States Patent  
Smith et al.

(10) Patent No.: US 8,783,919 B2  
(45) Date of Patent: Jul. 22, 2014

(54) BICYCLE LIGHTING APPARATUS AND METHOD OF USE

(75) Inventors: Brandon Smith, Park City, UT (US); Richard Smith, Park City, UT (US)

(73) Assignee: Led By Lite, LLC, Park City, UT (US)

( * ) Notice: Subject to any disclaimer, the term of this patent is extended or adjusted under 35 U.S.C. 154(b) by 49 days.

(21) Appl. No.: 13/237,720

(22) Filed: Sep. 20, 2011

(65) Prior Publication Data

US 2012/0243245 A1 Sep. 27, 2012

Related U.S. Application Data

(60) Provisional application No. 61/385,144, filed on Sep. 21, 2010.

(51) Int. Cl.
*B62J 6/00* (2006.01)
*F21V 33/00* (2006.01)

(52) U.S. Cl.
USPC .............. 362/473; 362/84; 362/225; 362/184

(58) Field of Classification Search
USPC ............... 362/84, 225, 249.01, 473, 474, 184
See application file for complete search history.

(56) References Cited

U.S. PATENT DOCUMENTS

| | | | |
|---|---|---|---|
| 4,319,307 A | 3/1982 | Turner | |
| 4,337,503 A | 6/1982 | Turner | |
| 5,008,782 A * | 4/1991 | Murray | 362/474 |
| 6,558,018 B1 | 5/2003 | Blum | |
| 6,761,240 B1 * | 7/2004 | Sollitto et al. | 180/219 |
| 7,649,447 B2 * | 1/2010 | Lu | 340/467 |
| 2005/0099799 A1 * | 5/2005 | Cugini et al. | 362/105 |
| 2007/0052200 A1 * | 3/2007 | Koharcheck et al. | 280/260 |
| 2007/0291473 A1 * | 12/2007 | Traynor | 362/106 |
| 2008/0180962 A1 * | 7/2008 | Edmond et al. | 362/473 |
| 2009/0040777 A1 * | 2/2009 | Palmer et al. | 362/473 |
| 2009/0080207 A1 * | 3/2009 | Hurwitz | 362/464 |
| 2011/0051442 A1 * | 3/2011 | Chang | 362/474 |

FOREIGN PATENT DOCUMENTS

| | | |
|---|---|---|
| DE | 202005015919 | 2/2006 |
| DE | 202008014756 | 2/2009 |
| KR | 20-1991-0015437 | 9/1991 |

OTHER PUBLICATIONS

International Preliminary Report on Patentability from related PCT Patent Application No. PCT/US2011/52408, May 17, 2013.
European Extended Search Report from related PCT Patent Application No. PCT/US2011052408, Feb. 3, 2014.

* cited by examiner

*Primary Examiner* — Ahn Mai
*Assistant Examiner* — Kevin Quarterman
(74) *Attorney, Agent, or Firm* — Bateman IP

(57) ABSTRACT

A lighting apparatus and method of use provides for increasing the visibility of a cyclist. The lighting apparatus includes a plurality of lights that may be arranged in a linear array to facilitate attachment to elongate members of a bicycle. The plurality of lights can be mounted on a substrate that is received in a mounting member, which in turn can be attached to a bicycle. Alternatively, the lighting apparatus may be formed integrally as part of a bicycle. Attachment of one or more lighting apparatuses to a bicycle can provide for increased visibility of a cyclist from the front, the rear, or the side, and may be configured to provide increased visibility when it is either dark or light outside.

23 Claims, 11 Drawing Sheets

BICYCLE LIGHTING APPARATUS AND METHOD OF USE

RELATED APPLICATIONS

The present application claims the benefit of U.S. Provisional Patent Application Ser. No. 61/385,144, filed Sep. 21, 2010, which is incorporated herein by references in its entirety.

BACKGROUND OF THE INVENTION

1. The Field of the Invention

The present invention relates to a bicycle lighting apparatus and methods of use thereof. More specifically, the present invention relates to an improved bicycle lighting system comprising an array of lights that can be used to increase the visibility of a cyclist, supplementing or replacing conventional bicycle lights.

2. State of the Art

Cycling has seen a marked increase in popularity in recent history. Bicycles can have numerous benefits compared to motor vehicles including exercise, reduced air and/or noise pollution, reduced traffic congestion, and can even reduce travel time in areas that are densely populated. However, it is often perceived that cycling can be dangerous and that there is high risk of serious injury in the event of a crash, especially one involving a motor vehicle.

Furthermore, as the popularity of recreational cycling has risen so has the length of a typical bicycle excursion or trip. Increasingly, bicycle trips are made at early morning or late evening hours and for extended distances, to the extent that riders are now frequently encountered on public roads at dawn or dusk, or even during the night. Because a large percentage of collisions between motor and pedal vehicles occur at night or other low light situations, providing a good light source for safety purposes has assumed considerable importance in the bicycle industry. In many jurisdictions it has become a legal requirement to have proper lighting when bicycling during times of low visibility, such as when it is dark. Additionally, automobile/bicycle accidents are also very common during the day because the driver of the automobile does not notice the cyclist.

When riding at night a cyclist must consider at least two things: being able to see the road in order to safely navigate his or her bicycle, and whether he or she is visible to motor vehicles driving on the same road, or approaching the road. On dark streets a cyclist must be able to see the road. How far ahead the cyclist needs to see depends on how fast the cyclist is riding, generally, the faster a cycler is traveling the more powerful the light should be. Most commonly, a cyclist uses a headlamp or lights crudely mounted to the frame of the bicycle to illuminate a travel path for the bicycle.

Maybe more importantly is the visibility of a cyclist to drivers of motor vehicles. There has been recognition that the more visible the cyclist is to motor vehicles, the safer the cyclist is and that there is less likelihood that the motor vehicle will collide with the cyclist. To this end, a large number of devices have been developed to assist in enhancing the visibility of the cyclist including fluorescent shirts, blinking lights secured to back-packs, headlamps and tail lamps, and even flags. On darker roads these devices may create enough contrast with the background landscape to usually make the cyclist visible to a driver of a motor vehicle. However, when riding at dawn, dusk, at night, or on roads with intermittent ambient light, these devices may not be adequate to make the cyclist visible.

Conventionally, cyclists riding at night have used a white light mounted so as to provide light at the front of a bicycle and a red light directed rearward of the bicycle in order to both illuminate the travel path and be visible to other road users. Although using this lighting system can be effective, there is still a significant need to increase the visibility of cyclist riding at night. For example the light forward and the light facing rearward provide little to no indication to a motor vehicle the intentions of the cyclist regarding changing lanes or turning. Likewise, such lights have little visibility from the side. While the cyclist may stick out his or her arm, the arm may not be visible as the lights do not usually illuminate the cyclist. Thus, a cyclist changing lanes or turning is at a significant risk of being hit by a motor vehicle driven by someone who does not understand the cyclist's intent. Likewise, a cyclist may be hit by a motor vehicle coming at a generally perpendicular angle because the driver of the motor vehicle simply did not see or notice the lights.

Thus, there is a need for an improved bicycle lighting apparatus that uses an array of lights to increase the safety of cycling on public roads. It is desirable that such bicycle lighting apparatus can easily be mounted to existing bicycles at various locations to provide for increased visibility of cyclists from the front, the back and the side.

SUMMARY OF THE INVENTION

It is an object of the present invention to provide a bicycle lighting apparatus that comprises an array of lights.

According to one aspect of the present invention, a bicycle lighting apparatus may include a plurality of high-intensity lights, such as high-intensity light-emitting diode (LED) lights, arranged linearly.

According to another aspect of the present invention, a bicycle lighting apparatus may include a plurality of lights disposed on an electrical substrate and a mounting member, such as a track, strap, etc., configured for removably receiving the electrical substrate.

According to another aspect of the present invention, the mounting member of the bicycle lighting apparatus may be comprised, at least in part, of material that light is able to pass through to thereby provide lighting in directions other than the direction in which the plurality of lights are pointed.

According to another aspect of the present invention, a bicycle lighting apparatus may include a cover to protect the array of lights from damage due to weather elements and/or foreign objects, etc. In at least one embodiment, the cover may be a transparent over-molding comprised of silicone.

According to still another aspect of the present invention, a bicycle lighting apparatus may include an array of lights that can be mounted to a bicycle at a variety of locations so as to provide for increased visibility of a cyclist from the front, back or side. For example, the bicycle lighting apparatus can be mounted to the front forks of a bicycle to increase the visibility of the cyclist from the front or along the back frame to increase the visibility of the cyclist from the rear. Alternatively, the bicycle lighting apparatus can be mounted to the frame of a bicycle so that the lights are facing perpendicular to the direction of the cyclist's path of travel in order to increase the visibility of the cyclist from the side.

In accordance with another aspect of the present invention, a bicycle lighting apparatus may be formed integrally with a bicycle or may be mounted to a bicycle using a variety of methods including hook and loop fasteners, quick connect clips, buttons, rivets, pins, knots, etc.

In accordance with another aspect of the present invention, a bicycle lighting apparatus may comprise a flexible mounting member, a backbone disposed on the mounting member, and a plurality of lights. The backbone may be configured to limit flexing of the plurality of lights when the plurality of lights are disposed on the mounting member.

In accordance with yet another aspect of the present invention, a bicycle lighting apparatus may be powered by a battery source that supplies 12 volts to the lighting apparatus.

According to another aspect of the present invention, a bicycle lighting apparatus may be connected to the battery source using a mini or micro USB cable.

According to another aspect of the present invention, a bicycle lighting system may comprise a plurality of bicycle lighting apparatuses and a controller. The controller may be wirelessly connected to the plurality of bicycle lighting apparatuses and configured to provide signals to the plurality of bicycle lighting apparatuses. For example, the controller may be used to turn the plurality of bicycle lighting apparatuses on and off, selectively modulate at least one bicycle lighting apparatus so as to indicate that the bicyclist is making a turn, and/or provide various modes of operation for both nighttime and daytime cycling.

According to another aspect of the present invention, a method of using a bicycle lighting apparatus may include mounting at least two linear arrays of lights to a bicycle to increase the visibility of a cyclist. For example, one linear array of lights can be mounted to one side of the front fork of a bicycle and a second linear array of lights can be mounted to the other side of the front fork of a bicycle. In addition to increasing the visibility of a cyclist, mounting at least two linear arrays to the front forks of a bicycle may aid the driver of a motor vehicle in determining the speed of the cyclist and will also provide additional light for the cyclist to navigate a travel path at night.

According to another aspect of the present invention, a method of using a bicycle lighting apparatus may include modulating the plurality of lights so as to increase the visibility of a cyclist during the daytime.

These and other aspects of the present invention are realized in a bicycle lighting apparatus and method of use as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The various elements of the invention accomplish various aspects and objects of the invention. It is appreciated that not every element of the invention can be clearly displayed in a single drawing, and as such not every drawing shows each element of the invention.

DETAILED DESCRIPTION

The drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
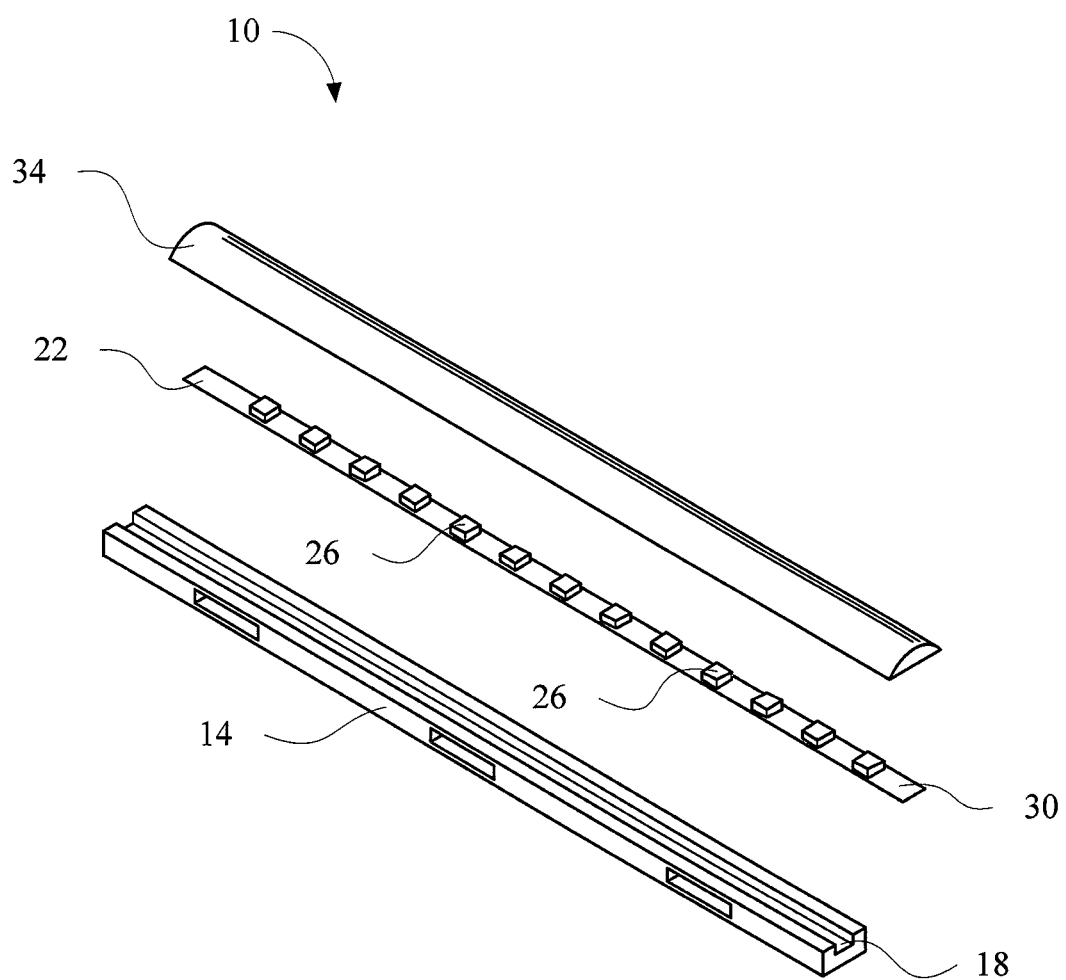
FIG. 1 shows an exploded, perspective view of a bicycle lighting apparatus made in accordance with the principles of the present invention.

Turning to FIG. 1, there is an exploded, perspective view of a bicycle lighting apparatus generally indicated at 10, made in accordance with the principles of the present invention. The bicycle lighting apparatus may include a mounting member, such as a track, strap, etc. 14, an electrical substrate 22 for mounting a plurality of lights 26 thereto, and a cover 24.

The mounting member 14 may include a recess or channel 18 for receiving the substrate 22 of the bicycle lighting apparatus 10. The track 14 may be comprised, in whole or in part, of material that light is able to pass through. For example, the track 14 may be comprised, in whole or in part, of a translucent or semi-translucent plastic which allows light to also emit from the bicycle lighting apparatus in directions other than the direction in which the plurality of lights are pointed.

Additionally, the mounting member 14 may be comprised of a flexible material, such as a flexible plastic, rubber, etc., which may allow a bicycle lighting apparatus 10 to conform to the shape of a bicycle member when mounted thereto. As explained in more detail below, the bicycle lighting apparatus may also comprise a backbone (FIG. 5) configured to limit flexing of the plurality of lights when the bicycle lighting apparatus is mounted on a bicycle.

The substrate 22 may have a plurality of lights 26 mounted thereto in a substantially linear array which facilitates mounting of the bicycle lighting apparatus 10 to elongated members of the bike frame, front forks, or other parts of the bike. The substrate 22 may include a wire connector 30 to connect the bicycle lighting apparatus 10 to a power supply, such as a battery system that supplies 12 volts to the bicycle lighting apparatus 10 (See e.g., FIG. 9). It will be appreciated by those in the art, however, that it is not essential to the present invention that the bicycle lighting apparatus 10 be powered by a 12 volt battery. For example, the bicycle lighting apparatus 10 could be powered by a 9 volt battery, a 3.7 volt battery which is step-up charged to provide 12 volts, other batteries, or a bicycle driven generator, such generators being well known in the art.

According to one aspect of the present invention, the plurality of lights 26 may include about 48 lights and be comprised of high-intensity LED lights. On some roads, fluorescent shirts, blinking lights secured to back-packs, headlamps and tail lamps, and even flags may create enough contrast with the background landscape to usually make the cyclist visible to a driver of a motor vehicle. However, when riding at dawn or dusk, at night, or on roads with intermittent ambient light, high-intensity lights should be used to ensure that the cyclist will be seen by automobile drivers who may be sharing the road.

The bicycle lighting apparatus 10 may include a cover 34 that protects the plurality of lights 26 from the weather elements and/or foreign objects, etc., which may otherwise cause damage to the lights 26. According to one aspect of the invention the cover 34 may be a silicone over-molding. However, those skilled in the art will appreciate that the cover 34 need only be made of a material that is sufficiently transparent to allow an effective amount of light to pass therethrough. Additionally, one skilled in the art will recognize that cover 34 could be attached so as to protect the plurality of lights 26 using a variety of methods.

Figure 2:
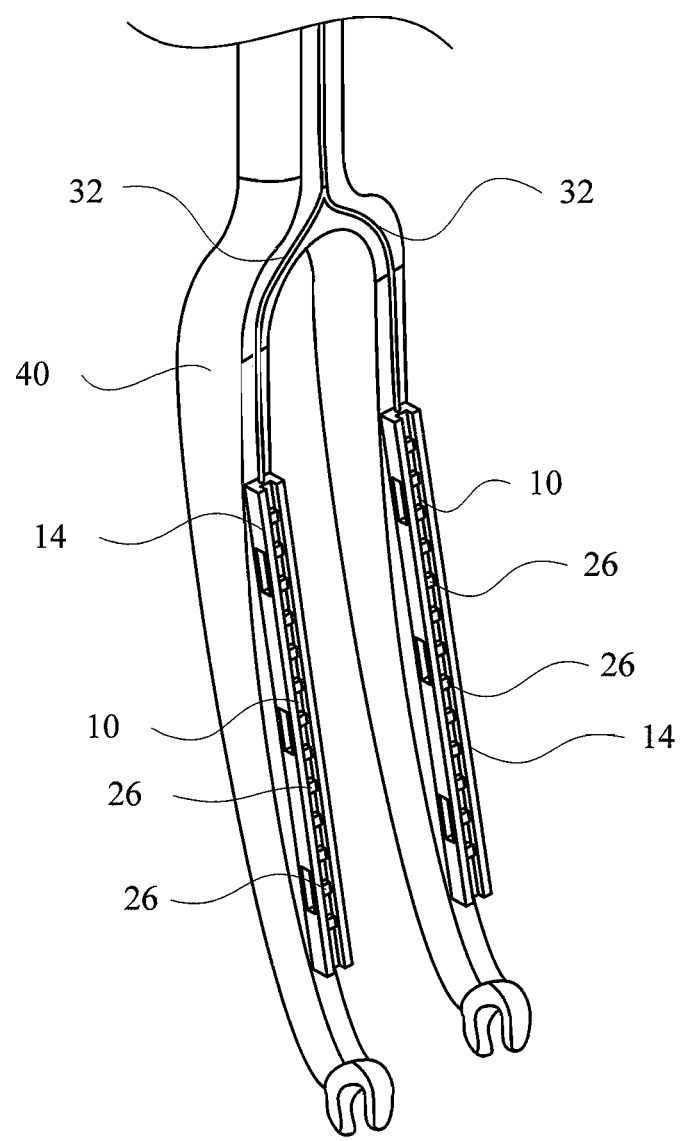
FIG. 2 shows a perspective view of the bicycle lighting apparatus mounted to a bicycle front fork.

Now turning to FIG. 2, there is shown a perspective view of bicycle lighting apparatuses 10 mounted to a bicycle front fork 40. One bicycle lighting apparatus 10 may be mounted to one side of the fork 40 and a second bicycle lighting apparatus 10 may be mounted to the other side of the fork 40. In addition to increasing the visibility of a cyclist because of the additive effect of the greater number of lights, mounting at least two linear arrays to the bicycle front fork 40 may aid the depth perception of a driver of a motor vehicle, which will help the driver of the motor vehicle determine the speed of the cyclist. It will be appreciated by those skilled in the art that two or more lighting apparatuses 10 may be mounted to a bike at locations other than the front fork in a substantially parallel alignment to increase the visibility of a cyclist and/or assist the driver of a motor vehicle in determining the speed at which the cyclist is traveling. The lighting apparatus 10 may be connected to a power source with cable 32.

Furthermore, either of the bicycle lighting apparatuses 10 shown in FIG. 2 may be selectively modulated, for example by using a wireless controller, to indicate when a bicyclist is going to make a turn. Additionally, the plurality of lights 26 can provide additional lighting for the cyclist to navigate by at times of low visibility.

As can be seen in FIG. 2, the linear arrangement of the plurality of lights 26 facilitates mounting of the bicycle lighting apparatus 10 to the elongated, relatively thin arms of the front fork 40. The lighting apparatus 10 can be removably attached to the bicycle using a variety of methods. For example, the track 14 can include a magnetic surface disposed in contact with the frame of a steel bicycle. Another example of how the lighting apparatus 10 could be attached to the surface of a bicycle is by gluing, welding, bolting, etc., the lighting apparatus to the bicycle. Alternatively, the bicycle lighting apparatus 10 could be integrally formed as part of the bicycle.

Figure 3:
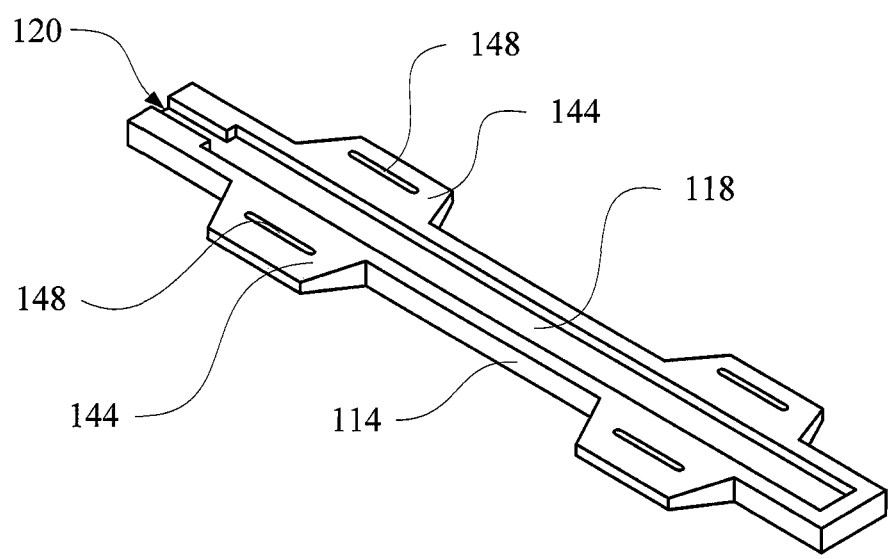
FIG. 3 shows a perspective view of a track of another bicycle lighting apparatus made in accordance with the principles of the present invention.
Figure 4:
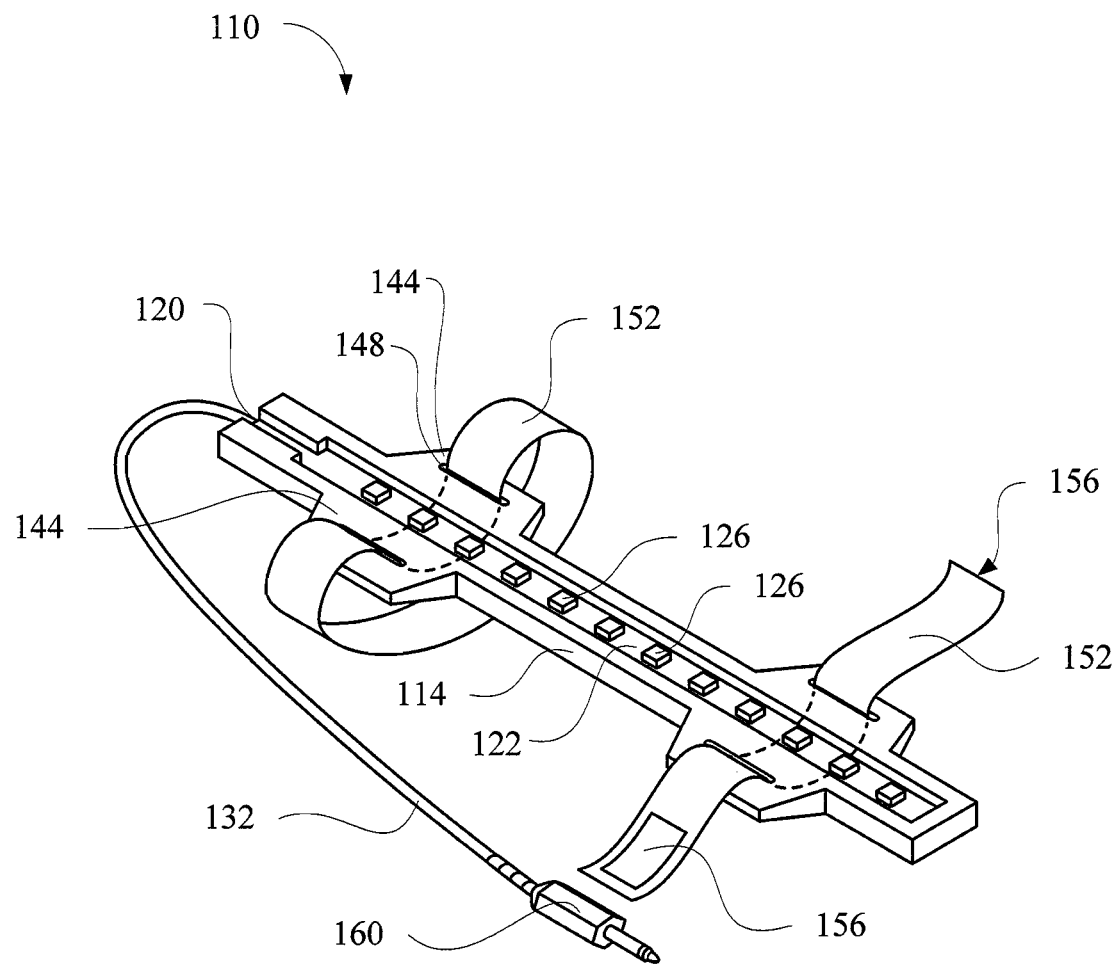
FIG. 4 shows a perspective view of a bicycle lighting apparatus configured for fast and simple mounting to a bicycle.

Turning now to FIGS. 3 and 4, there is shown a perspective view of another mounting member 114 and bicycle lighting apparatus, generally indicated at 110, made in accordance with the principles of the present invention. Mounting member 114 may include a channel 118 and channel 120 into which an electrical substrate 122 and cable 132 is placed, as shown in FIG. 4. Mounting member 114 may include one or more attachment members 144 having openings 148. The one or more attachment members 144 may allow the lighting apparatus 110 to be secured to a bicycle using straps 152. For example, straps 152 may secure the lighting apparatus 110 to the bicycle through engagement with openings 148 and an elongate member of the bicycle frame, front fork, etc.

According to one aspect of the invention, straps 152 may be secured about the elongate member of the bicycle using hook and loop fasteners 156. It will be apparent to those skilled in the art however, that a variety of methods could be used to secure the lighting apparatus 110 to a bicycle. For example, one could merely tie the straps 152 together using a knot. Other methods of securing straps 152 together could include using pins, buttons, a buckle, etc. The lighting apparatus 110 may be connected to a power source (See e.g., FIG. 9), such as a 12 volt battery, a battery pack, generator, etc., using cable 132, and connector 160. This may be done prior to or after attaching the lighting apparatus 110 to the bicycle.

Figure 5:
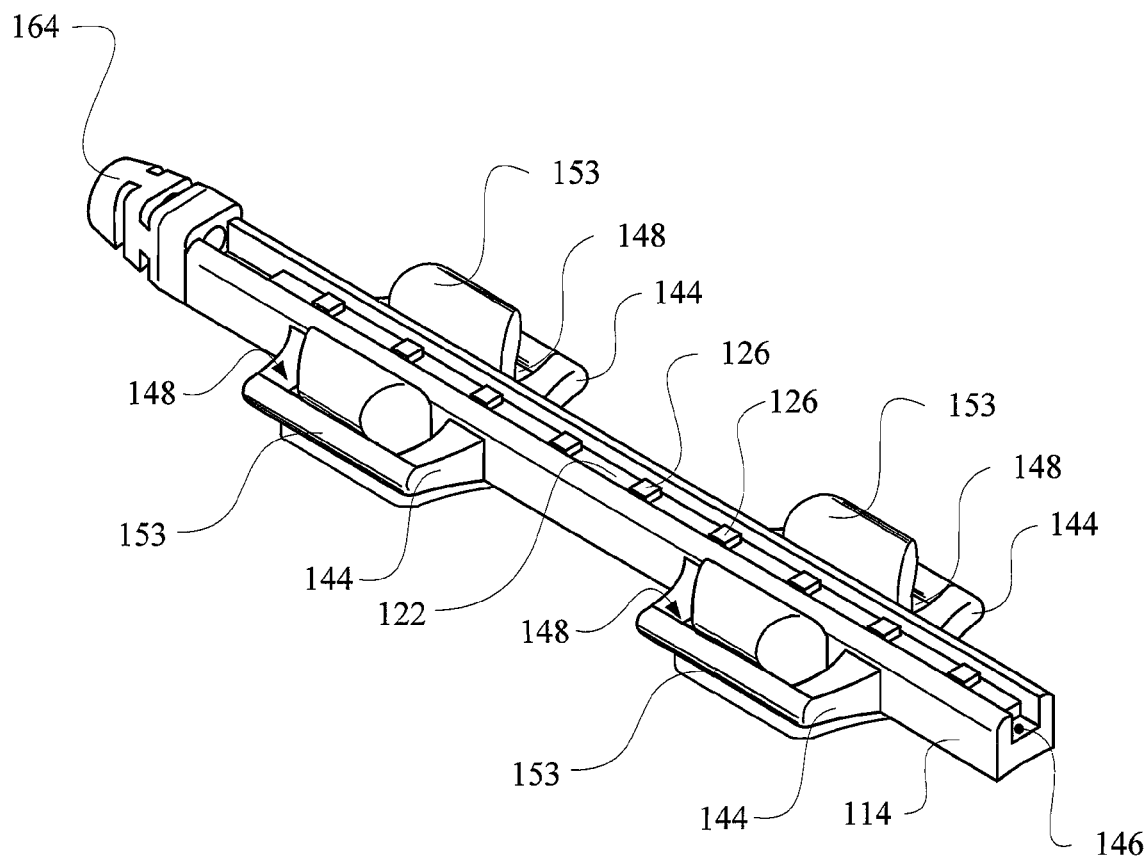
FIG. 5 shows a perspective view of an alternative method of mounting a bicycle lighting apparatus to a bicycle.
Figure 5A:
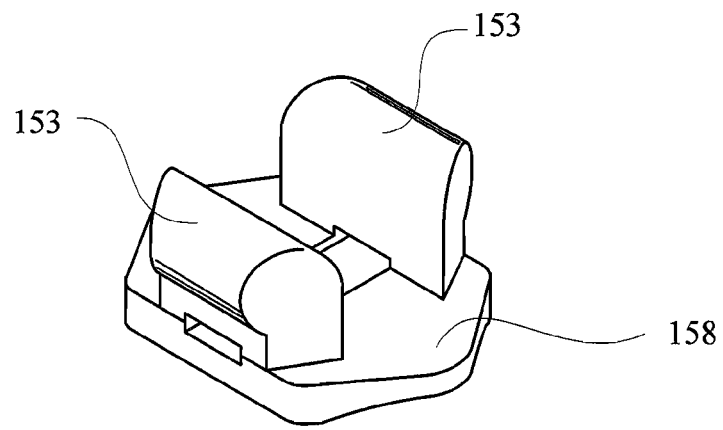
FIG. 5A shows a perspective view of a mounting clip of FIG. 5.

Referring now to FIGS. 5 and 5A, there are shown perspective views of an alternative method of removably mounting a bicycle lighting apparatus 110 to a bicycle. A clip 158 may be mounted on a bicycle such that arms 153 extend away from an elongate member of a bicycle. Those skilled in the art will appreciate that the clip 158 may be mounted to a bicycle using a variety of methods. The openings 148 of the bicycle mounting apparatus may be configured to receive one or more arms 153, which may be sufficiently flexible to allow the arms to be manipulated through the openings 148. Thus, by extending one or more arms 153 of the mounting clip 158 through openings 148, the bicycle lighting apparatus 110 may be quickly and easily mounted to a bicycle. Likewise, the clips 158 allow for quick and easy removal of the bicycle lighting apparatus 110 from a bicycle when so desired. For example, the bicycle lighting apparatus 110 may be quickly removed when the bicycle is left unattended so as to prevent theft of the bicycle lighting apparatus 110.

Also shown in FIG. 5, is a backbone 146. As explained above, mounting member 144 may be comprised of flexible materials to allow for the bicycle lighting apparatus to conform to the shape of an elongate member of a bicycle when mounted thereto. It has been observed, however, that flexing of the mounting member 144 may cause damage to the electrical substrate 122 and plurality of lights 126 over a period of time of use which may lead to malfunction of the plurality of lights 126. Including a sufficiently rigid backbone 146 in the bicycle lighting apparatus may limit the amount of flexing experienced by the electrical substrate 122 and plurality of lights 126, thus, increasing the durability of bicycle lighting apparatus 110. The backbone 146 may provide support for the electrical substrate 122 and plurality of lights 126 without being attached thereto.

Additionally, the bicycle lighting apparatus 110 as shown in FIG. 5 may include a formation 164 that allows the bicycle lighting apparatus to be quickly connected and disconnected from a power source (not shown). For example, the formation 164 may be configured to receive an end of a mini or micro USB cable that is connected to a power source at an opposing end.

Figure 6:
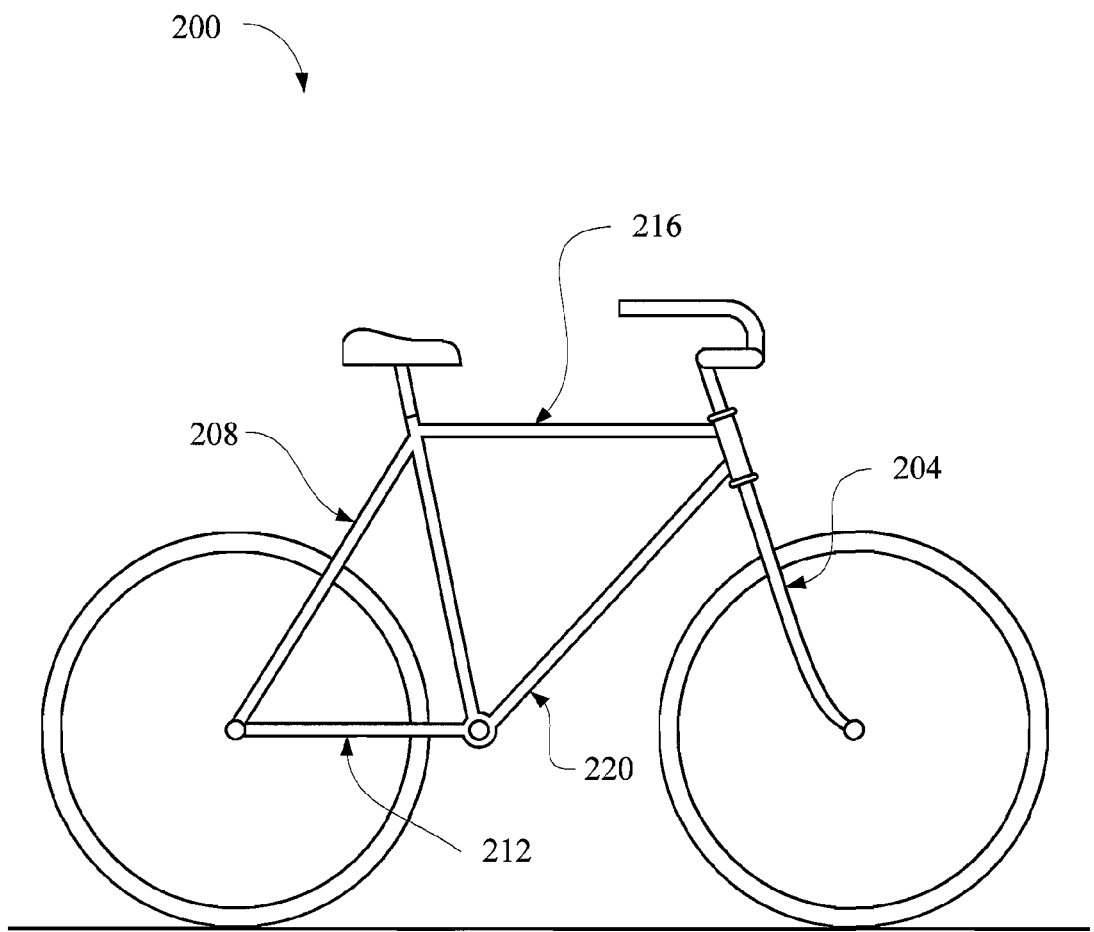
FIG. 6 shows a side view of a bicycle indicating at least some of the locations where the bicycle lighting apparatus can be removably attached.

Now turning to FIG. 6, there is shown a side view of a bicycle, generally indicated at 200, and at least some of the locations where the bicycle lighting apparatus can be removably attached. As discussed above, one or more lighting apparatuses 10, 110 can be attached the front fork 204 of bicycle 200. Additionally (or alternatively) lighting apparatuses 10, 110 can be attached to the frame at the back or seat stay of the bicycle 208 and disposed rearward so as to increase the visibility of the cyclist from the rear. The lighting apparatus 10, 110 can also be attached along the bottom of the bicycle (i.e. the chain stay) 212 to provide a ground effect look, or along the top bar 216 or down bar 220 to improve visibility.

In addition to increasing the visibility of a cyclist during times of day when visibility is low, the bicycle lighting apparatus 10, 110 can also be used to increase the visibility of a cyclist when riding during the day. Having lights emitting from the bicycle makes the bicycle more visible to drivers of automobiles similar to daytime running lights on an automobile. Additionally, an elongate array of lights is somewhat unique pattern and is more likely to grab the attention of a driver of an automobile.

Also, the lighting apparatus 10, 110 can be configured to automatically modulate on and off, so as to create a blinking light. Lights that blink may be more effective in gaining the attention of drivers of automobiles making it more likely that a distracted driver will become aware of the cyclist before colliding with the cyclist. Thus, by including the ability to automatically modulate between on and off, the lighting apparatus 10, 110 is able to also increase the safety of cycling during the day.

Figure 7:
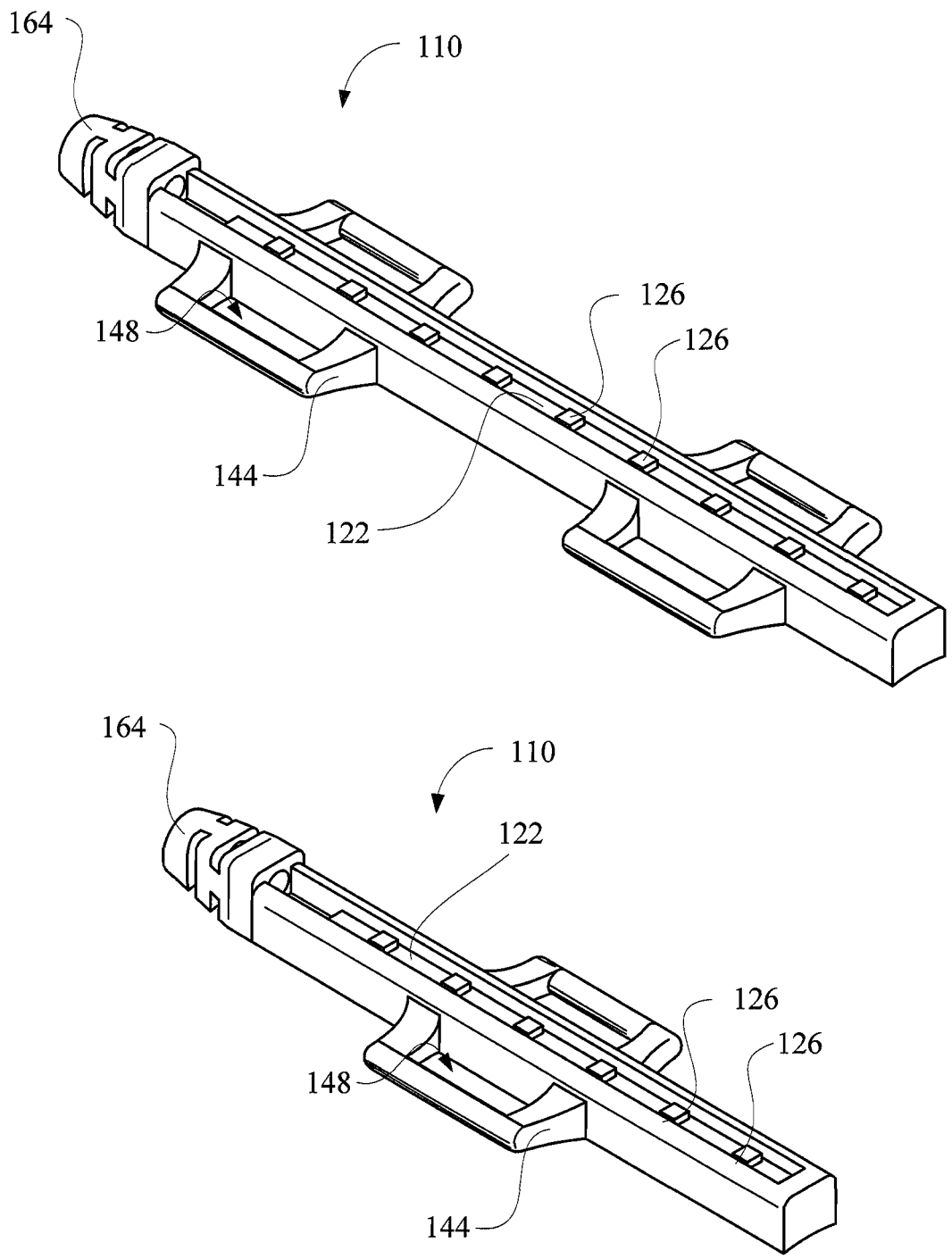
FIG. 7 shows a perspective view of bicycle lighting apparatuses of various size.

Turning now to FIG. 7, a perspective view of bicycle lighting apparatuses 110 of various sizes is shown. Apparatus 110 is similar to apparatus 10 discussed above and may include any parts thereof.

It will be appreciated that the bicycle lighting apparatuses 110 may be made in a variety of sizes to accommodate attachment at various locations on a bicycle. For example, it may be desirable to mount a shorter bicycle lighting apparatus to the fork of a bicycle and a longer bicycle lighting apparatus to elongate members of the bicycle's frame, or vice versa. Bicycle lighting apparatuses 10 may also vary in width to accommodate different sizes of frames (e.g. mountain bike, road bike, bmx, etc.). For example, a bicycle lighting apparatus 110 intended to be mounted to a bicycle having a sufficiently large frame may have a mounting member 144 wide enough to dispose multiple linear arrays of lights therein. This may be advantageous as the inclusion of more lights may increase the visibility of the cyclist.

Figure 8:
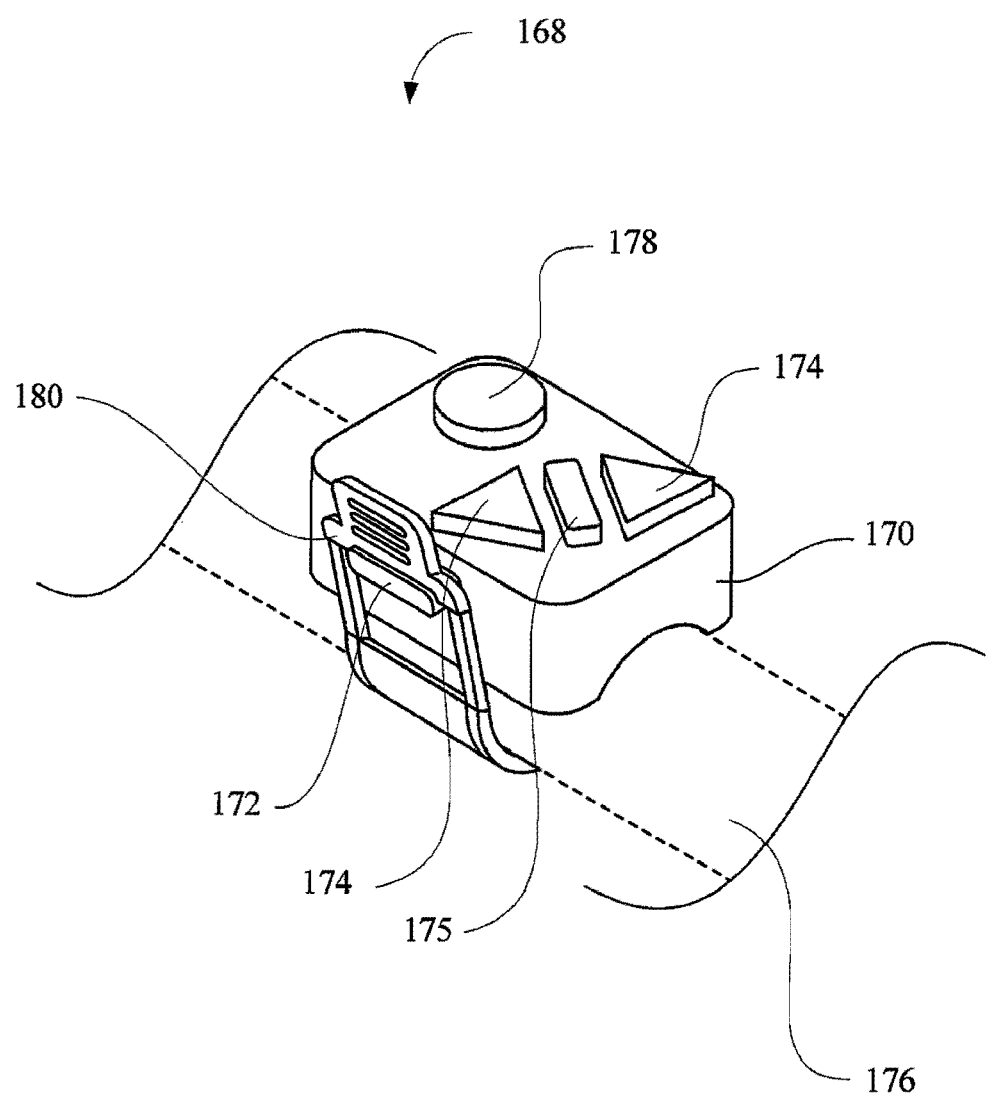
FIG. 8 shows a perspective view of a controller that may be used in connection with a bicycle lighting apparatus of the present invention.

Referring now to FIG. 8, there is shown a perspective view of a controller that may be used in connection with a bicycle lighting apparatus of the present invention. The controller may include a body 170 which may be removably mounted to, for example, the handlebars 176 of a bicycle. The controller 168 may be part of a bicycle lighting system and be configured to send signals to one or more bicycle lighting apparatuses wirelessly. It will be appreciated that the controller may be connected to the bicycle lighting system using alternate methods, such as a cable. When mounted to the handlebars 176 of a bicycle, a cyclist may be able to send signals to one or more bicycle lighting apparatuses to change modes and/or engage a turn signal system, without having to remove his or her hands from the handlebars 176.

The controller 168 may include a body 170 shaped to provide for secure attachment to a cylindrical portion (or some other shaped portion) of a bicycle. The controller 168 may be mounted to a portion of a bicycle using a flexible strap 180. The flexible strap 180 may be configured to extend around the portion of a bicycle and engage a projection 172 disposed on the body 170 of the controller 168.

The controller 168 may also include one or more signal actuators, such as buttons 174, 175 and 178. It will be appreciated the signal actuators may be alternatively comprised of switches, dials, etc. The signal actuators may be configured to provide various signals to bicycle lighting apparatuses. For example, button 178 may be used to activate different modes of operation for the bicycle lighting apparatuses. The exemplary modes of operation may include: all lights on, all lights off, all front lights on and back lights modulating between on and off (nighttime mode); and/or all lights modulating between on and off (daytime mode). They could also control intensity.

The controller 168 may include separate buttons 174 which may be used by a cyclist to modulate the left or right bicycle lighting apparatus(es) between on and off. Modulating the left or right bicycle lighting apparatus(es) between on and off so may provide a turn signal when the cyclist desires to make a turn, thereby alerting drivers of the impending turn and increasing the safety of the cyclist. If, for example, a cyclist is operating a bicycle lighting system of the present invention in daytime mode (i.e. all lights modulating between on and off), then pressing a button 174 may cause the lighting apparatuses mounted on the left side to modulate between on and off while causing the lighting apparatuses mounted on the right side to remain on (i.e. no modulation) to thereby signal a left turn. The bicycle lighting system may operate in this left turn signal mode for a period of time, for example 10 seconds, and then automatically return to operating all lights in daytime mode.

The controller 168 may also include a projection 178, such as a locator knob, which assists the cyclist in finding the location of buttons 174 without having to remove his or her attention from the road. Additionally, buttons 174 may be oriented at an angle relative to handlebar 176 to increase the ergonomics of use of controller 168. For example, buttons 174 may be oriented at angles between about 20 degrees and 70 degrees, or more preferably between angles of about 30 degrees and 60 degrees.

Figure 9:
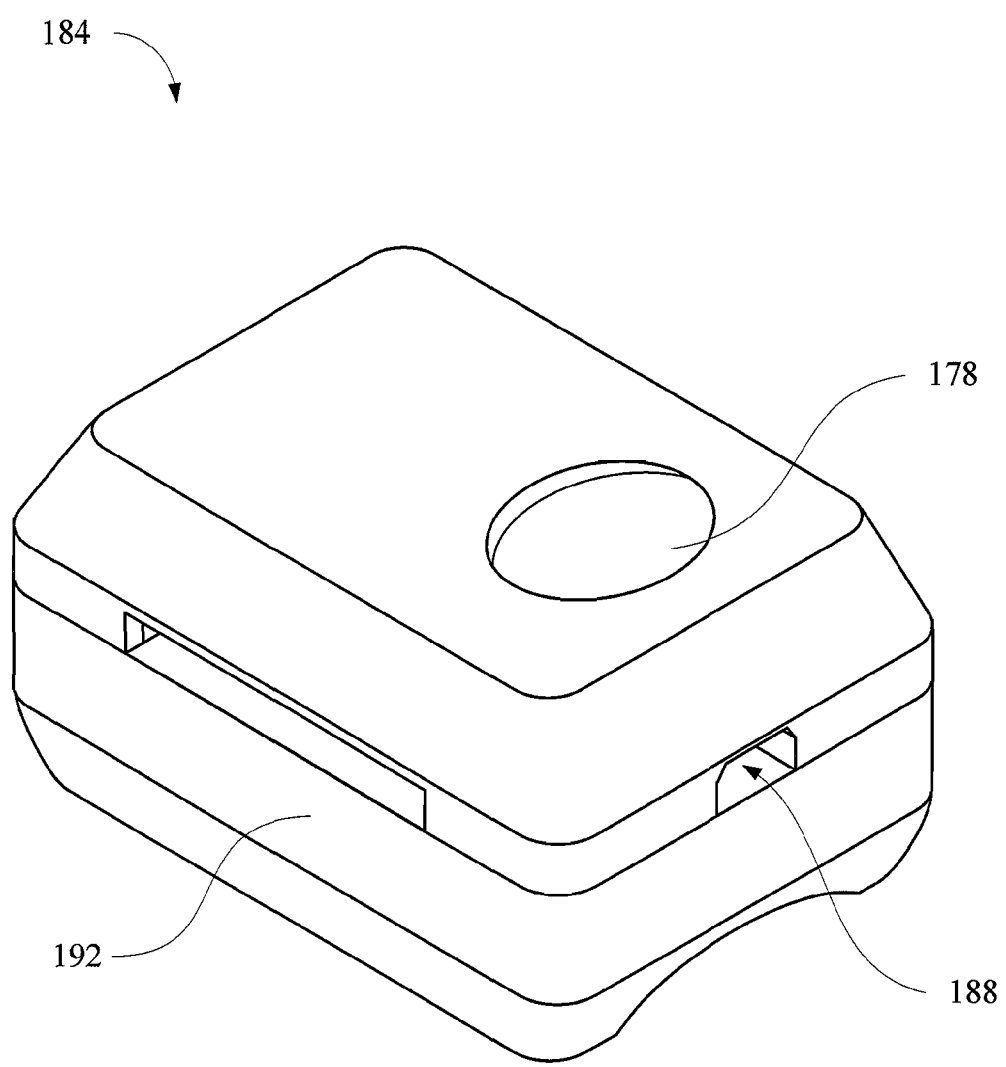
FIG. 9 shows a perspective view of a battery source for a bicycle lighting apparatus.
Figure 10:
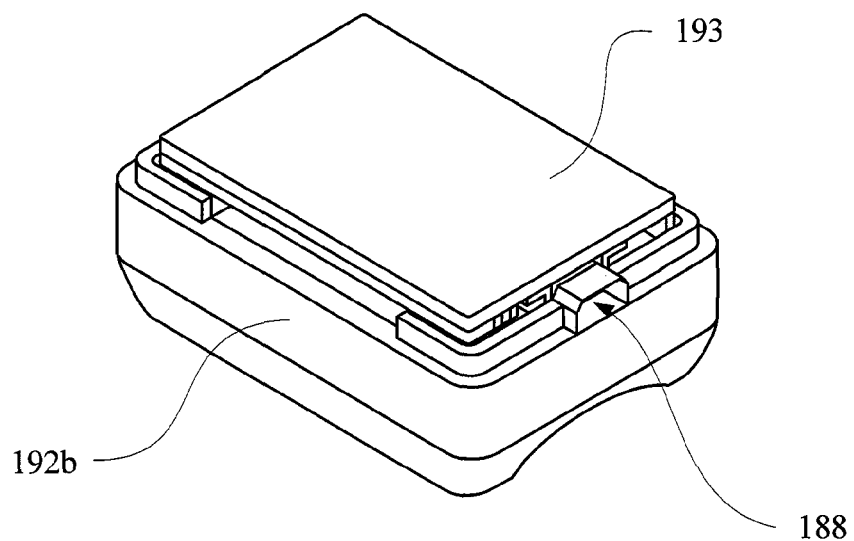
FIG. 10 shows a perspective view of the internal components of the battery source shown in FIG. 9.
Figure 11:
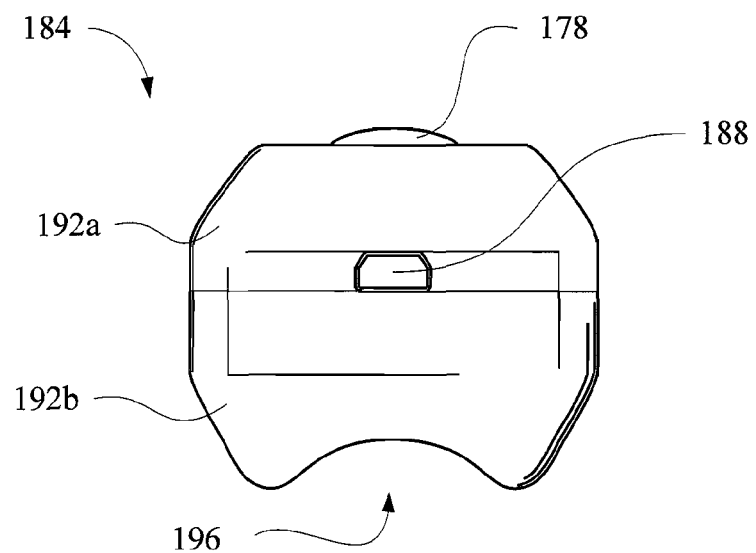
FIG. 11 shows a side view of the battery source of FIG. 9.

Turning now to FIGS. 9-11, there is shown a battery source, generally indicated at 184, for a bicycle lighting apparatus. The battery source 184 may comprise a rechargeable battery, such as a lithium ion battery or other suitable battery. The rechargeable battery may be charged, for example by directly connecting the battery source 184 to a wall outlet or by connecting the battery source 184 to a computer via a USB connection.

The battery source 184 may include a housing (i.e. a battery pack) having a removable top portion 192a and a bottom portion 192b. The battery source may include a battery (such as a 3.7 volt battery) and other electrical components 193, and a connection site 188 for connecting the battery source 184 to one or more bicycle lighting apparatuses. Other power levels may also be used.

The connection site 188 may be comprised of an opening configured to receive a mini-USB cable. It will be appreciated, however, that alternate connection sites may be used to connect the battery source 184 to bicycle lighting apparatuses.

In one presently preferred embodiment, the battery source is configured to deliver 12 volts to a bicycle lighting apparatus of the present invention. According to one aspect of the invention, the battery source may be configured to step-up charge a 3.7 volt battery to deliver 12 volt to one or more bicycle lighting apparatuses. It will be appreciated that the battery source may use a variety of methods to deliver 12 volts to a bicycle lighting apparatus. Alternatively, a bicycle lighting apparatus may be configured to receive more or less voltage than 12 volts. In such cases, the battery source 184 may be configured to deliver the correct amount of voltage.

The battery pack 192 may include a surface 196 that conforms to a cylindrical portion of a bicycle. The conforming surface 196 of the battery pack 192 may allow the battery source 184 to be securely attached to a bicycle. Also, the battery source 184 may include one or more signal actuators, such as button 178. Similar to the signal actuator described above with respect to the controller 168 (FIG. 8), the signal actuator 178 associated with the battery source 184 may be used to activate different modes of operation for the bicycle lighting apparatus(es).

Figure 12:
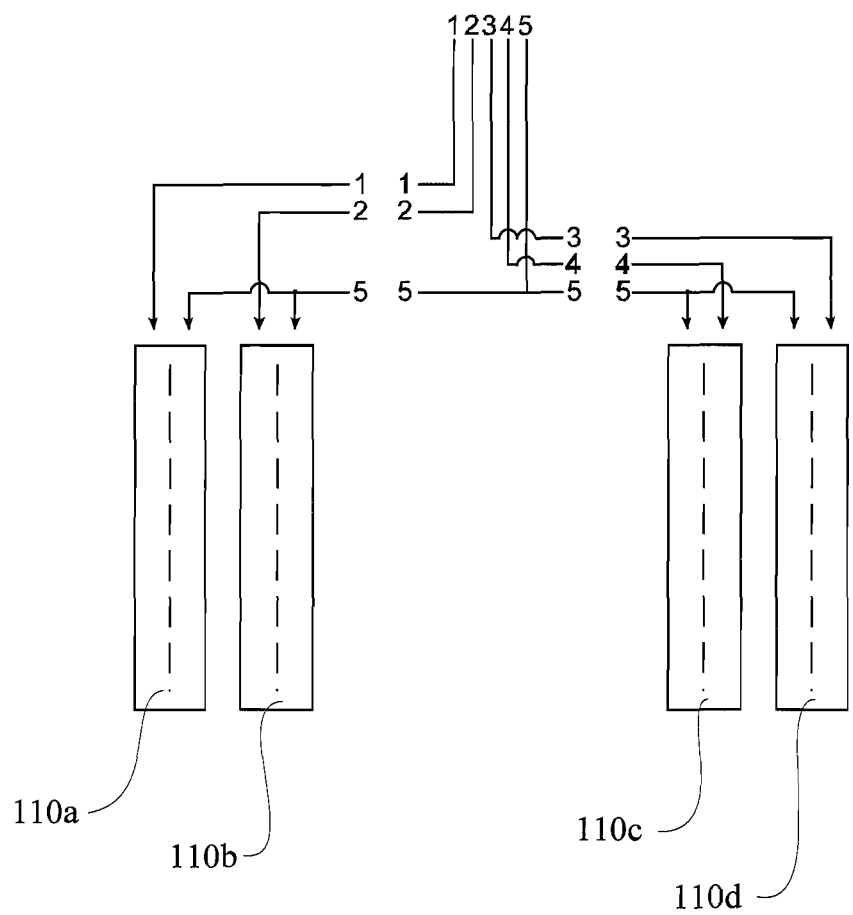
FIG. 12 shows a diagram of a wire harness that may be used to connect a battery source to a plurality of bicycle lighting apparatuses.

Turning now to FIG. 12, there is shown an exemplary diagram of a wire harness that may be used in a bicycle lighting system according to principles of the present invention. The wire harness may include one or more connections 1,2 for bicycle lighting apparatus(es) 110a, 110b mounted to the front of a bicycle and one or more connections 3,4 for bicycle lighting apparatus(es) 110c, 110d mounted to the rear of a bicycle. The wire harness may also include a common connection 5 which supplies power from a battery source to each of the bicycle lighting apparatuses. The wire harness may be comprised of a mini-USB cable, however, those skilled in the art will appreciate that alternate wire harnesses may be used without deviating from the scope of the present invention. It will also be appreciated that the connections to the bicycle lighting apparatuses may vary.

The wire harness may be used to provide signals to an individual bicycle lighting apparatus depending on the mode a cyclist desires to use. For example, a signal may be sent to bicycle lighting apparatuses 110a (front, left) and 110d (back, left) via connections 1 and 3, respectively, to modulate the bicycle lighting apparatuses between on and off to indicate that the cyclist is going to make a left turn. Likewise, sending a signal to bicycle lighting apparatuses 110b (front, right) and 110c (back, right) via connections 2 and 4, respectively, to modulate the bicycle lighting apparatuses between on and off may indicate that the cyclist is going to make a right turn.

It will be appreciated that various aspects of the invention can be used together. It will also be appreciated that the invention has numerous different aspects. For example, in accordance with one aspect of the invention, a lighting apparatus may comprise a plurality of lights arranged in a linear array, a power source connected to the plurality of lights, and a channel for receiving the plurality of lights, wherein the channel is configured to be disposed at a first location on a bicycle.

The lighting apparatus may further have the channel beings located on a mounting member configured to be removably attached to the bicycle; a cover disposed on the lighting apparatus so as to provide protection from damage to the plurality of lights; channel integrally formed on at least one surface of the bicycle; the mounting member further comprises at least one attachment member, and the attachment member configured to facilitate removably attaching the mounting member to the bicycle; a clip for mounting on the bicycle, wherein the clip is configured to engage the attachment member to facilitate removably attaching the mounting member to the bicycle; a controller configured to be disposed at a second location on the bicycle remote from the channel at the first location; the controller in wireless communication with the plurality of lights; the mounting member being removably attached to the front fork of a bicycle; the plurality of lights comprising high-intensity LED lights; and/or the power source comprising a 3.7 volt battery step-up charged to provide 12 volts to the plurality of lights, or any combination thereof.

A bicycle lighting system of the present invention may have at least one mounting member having a plurality of lights disposed thereon, wherein the plurality of lights are configured to receive signals to vary the mode in which the plurality of lights operate; a power source connected to the plurality of lights; and a signal actuator for delivering a signal to the plurality of lights, wherein the signal changes the mode in which the plurality of lights operate; and wherein the mounting member is configured to be attached to an elongate member of a bicycle.

The lighting system may also have: a controller, wherein the signal actuator is disposed on the controller and wherein the signal actuator is configured to deliver a signal to the plurality of lights wirelessly; at least two mounting members, wherein the at least two members each having a plurality of lights disposed thereon; the plurality of lights disposed on each of the at least two mounting members are arranged linearly; at least two mounting members comprising a first mounting member and a second mounting member, and wherein the first and second mounting members are attached to a bicycle in a substantially parallel orientation; the mounting member being flexible, and further comprising a backbone disposed on the mounting member, the backbone configured to limit movement of the plurality of lights relative to the mounting member; and/or a clip having at least one arm, wherein the clip is configured to be mounted to the bicycle, and wherein the mounting member includes an attachment member configured to removably receive the at least one arm of the clip, or any combination thereof.

A method for increasing the visibility of a cyclist in accordance with the invention may include selecting a lighting apparatus: a lighting apparatus having a plurality of lights; a power source connected to the plurality of lights; and a channel for receiving the plurality of lights; and locating at least two lighting apparatuses at different locations on a bicycle so as to present the plurality of lights of the lighting apparatuses to drivers when the cyclist is riding; wherein the at least two lighting apparatuses are in communication with a signal actuator configured to deliver a signal to a first lighting apparatus of the at least two lighting apparatuses, wherein the signal selectively changes the mode in which the first lighting apparatus is operating without changing the mode in which a second lighting apparatus of the at least two lighting apparatuses is operating.

The method may also include: further comprising the step of arranging the plurality of lights in a linear array on the at least two lighting apparatuses, wherein the at least two lighting apparatuses each have a channel located on a flexible mounting member; the step of disposing a backbone in the channel of the flexible mounting members so as to limit the movement of the plurality of lights relative to the mounting member when a cyclist is riding; and/or the step of mounting a controller at a location remote from the at least two lighting apparatuses, wherein the signal actuator is disposed on the controller and configured to deliver a signal to the first lighting apparatus wirelessly, or combinations thereof.

A method for making a bicycle more visible may include selecting at least two lights arrays, and attaching at least one array to the fork of a bicycle. It may also include attaching at least one array to one of the seat stay and the chain stay of a bicycle.

There is thus disclosed an improved bicycle lighting apparatus and method of use. It will be appreciated that numerous changes may be made to the present invention without departing from the scope of the claims. The appended claims are intended to cover such modifications.

What is claimed is:

1. A lighting apparatus comprising:
a plurality of lights arranged in a linear array;
a power source connected to the plurality of lights; and
a flexible mounting member comprising a channel for receiving the plurality of lights, wherein the channel has one or more upwardly extending sides comprised of a transparent material through which light is able to pass, and wherein the linear array is recessed within the channel and covered in the channel within a transparent flexible over-molding;
wherein the flexible mounting member is configured to be disposed at a first location on a bicycle.

2. The lighting apparatus according to claim 1, wherein the channel is located on a mounting member configured to be removably attached to the bicycle.

3. The lighting apparatus according to claim 1, wherein the channel is integrally formed on at least one surface of the bicycle.

4. The lighting apparatus according to claim 2, wherein the mounting member further comprises at least one attachment member, and wherein the attachment member is configured to facilitate removably attaching the mounting member to the bicycle.

5. The lighting apparatus according to claim 4, further comprising a clip for mounting on the bicycle, wherein the clip is configured to engage the attachment member to facilitate removably attaching the mounting member to the bicycle.

6. The lighting apparatus according to claim 1, further comprising a controller, wherein the controller is configured to be disposed at a second location on the bicycle remote from the channel at the first location.

7. The lighting apparatus according to claim 6, wherein the controller is in wireless communication with the plurality of lights.

8. The lighting apparatus according to claim 2, wherein the mounting member is removably attached to the front fork of a bicycle.

9. The lighting apparatus according to claim 1, wherein the plurality of lights comprise high-intensity LED lights.

10. The lighting apparatus according to claim 1, wherein the power source comprises a 3.7 volt battery step-up charged to provide 12 volts to the plurality of lights.

11. A bicycle lighting system comprising:
at least one flexible mounting member having a plurality of lights disposed thereon, wherein the flexible mounting member comprises a channel configured to receive an array of lights, wherein the channel has one or more upwardly extending sides comprised of a transparent material through which light is able to pass, and wherein the linear array is recessed within the channel and covered in the channel within a transparent flexible over-molding, wherein the plurality of lights are configured to receive signals to vary the mode in which the plurality of lights operate;
a power source connected to the plurality of lights; and
a signal actuator for delivering a signal to the plurality of lights, wherein the signal changes the mode in which the plurality of lights operate;
wherein the mounting member is configured to be attached to an elongate member of a bicycle.

12. The system of claim 11, further comprising a controller, wherein the signal actuator is disposed on the controller and wherein the signal actuator is configured to deliver a signal to the plurality of lights wirelessly.

13. The system of claim 11, further comprising at least two mounting members, wherein the at least two members each having a plurality of lights disposed thereon.

14. The system of claim 13, wherein the plurality of lights disposed on each of the at least two mounting members are arranged linearly.

15. The system of claim 11, wherein the at least two mounting members comprise a first mounting member and a second mounting member, and wherein the first and second mounting members are attached to a bicycle in a substantially parallel orientation.

16. The system of claim 11, wherein the mounting member is flexible, and further comprising a backbone disposed on the mounting member, the backbone configured to limit movement of the plurality of lights relative to the mounting member.

17. The system of claim 11, further comprising a clip having at least one arm, wherein the clip is configured to be mounted to the bicycle, and wherein the mounting member includes an attachment member configured to removably receive the at least one arm of the clip.

18. A method for increasing the visibility of a cyclist, the method comprising:
selecting a lighting apparatus, the lighting apparatus comprising:
a plurality of lights arranged in a flexible mounting member comprising a channel configured to receive the plurality of lights, wherein the channel has one or more upwardly extending sides comprised of a transparent material through which light is able to pass, and wherein the plurality of lights is recessed within the channel and covered in the channel within a transparent flexible over-molding;
a power source connected to the plurality of lights; and
locating at least two lighting apparatuses at different locations on a bicycle so as to present the plurality of lights of the lighting apparatuses to drivers when the cyclist is riding;
wherein the at least two lighting apparatuses are in communication with a signal actuator configured to deliver a signal to a first lighting apparatus of the at least two lighting apparatuses, wherein the signal selectively changes the mode in which the first lighting apparatus is operating without changing the mode in which a second lighting apparatus of the at least two lighting apparatuses is operating.

19. The method according to claim 18, further comprising the step of arranging the plurality of lights in a linear array on the at least two lighting apparatuses, wherein the at least two lighting apparatuses each have a channel located on a flexible mounting member.

20. The method according to claim 19, further comprising the step of disposing a backbone in the channel of the flexible mounting members so as to limit the movement of the plurality of lights relative to the mounting member when a cyclist is riding.

21. The method according to claim 18, further comprising the step of mounting a controller at a location remote from the at least two lighting apparatuses, wherein the signal actuator is disposed on the controller and configured to deliver a signal to the first lighting apparatus wirelessly.

22. A method for making a bicycle more visible, the method comprising:
selecting at least two lights arrays arranged on a flexible mounting member comprising a channel configured to receive the light arrays, wherein the channel has one or more upwardly extending sides comprised of a transparent material through which light is able to pass, and wherein the light array is recessed within the channel and covered in the channel within a transparent flexible over-molding, and
attaching at least one array to the front of a fork of a bicycle.

23. The method according to claim 22, wherein the method comprises attaching at least one array to one of the seat stay and the chain stay of a bicycle.

* * * * *